United States Patent [19]

Ray

[11] Patent Number: 4,698,319
[45] Date of Patent: Oct. 6, 1987

[54] DENSIFIED COMPOSITE CONTAINING ONE OR MORE INTERWOVEN MATRIX COMPOSITIONS

[75] Inventor: Siba P. Ray, Pittsburgh, Pa.

[73] Assignee: Aluminum Company of America, Pittsburgh, Pa.

[21] Appl. No.: 789,434

[22] Filed: Oct. 21, 1985

Related U.S. Application Data

[63] Continuation-in-part of Ser. No. 604,913, Apr. 27, 1984, which is a continuation-in-part of Ser. No. 423,673, Sep. 27, 1982, Pat. No. 4,454,015.

[51] Int. Cl.$^4$ .................... C04B 35/56; C04B 35/58; C04B 35/10
[52] U.S. Cl. .................................. 501/87; 501/88; 501/89; 501/95; 501/96; 501/97; 501/98; 264/65; 252/500; 252/518; 252/520; 252/521
[58] Field of Search .................... 204/67, 291; 501/87, 501/88, 89, 95, 96, 97, 98; 264/65; 252/500, 518, 520, 521

[56] References Cited

U.S. PATENT DOCUMENTS 3,143,413 8/1964 Krapf .................................. 501/87
4,500,643 2/1985 Gesing et al. .................... 204/67
4,540,475 9/1985 DeAngelis ........................ 204/291

Primary Examiner—Mark L. Bell
Attorney, Agent, or Firm—Andrew Alexander; John P. Taylor

[57] ABSTRACT

A densified composite is disclosed which comprises one or more substantially interwoven matrix compositions, which have been densified either during formation of the interwoven matrix composition to provide a composite having a low porosity and a density of at least 75% of the theoretical density. The interwoven matrix composition may be densified during formation either by the addition to the reactants of a densification agent or by maintaining sufficient pressure on the reactants during the formation of the interwoven matrix. The densification of the interwoven matrix may be carried out after formation of the interwoven matrix composition either by heating the composition to a sufficient temperature for a sufficient time period to achieve the desired densification or by immersing the interwoven matrix composition in a molten metal or a molten metal salt to impregnate the interwoven matrix composition to achieve the desired densification.

5 Claims, 1 Drawing Figure

DENSIFIED COMPOSITE CONTAINING ONE OR MORE INTERWOVEN MATRIX COMPOSITIONS

CROSS-REFERENCE TO RELATED APPLICATIONS

This application is a Continuation-In-Part of application Ser. No. 604,913 filed Apr. 27, 1984, which is a Continuation-In-Part of application Ser. No. 423,673, filed Sept. 27, 1982, and now issued as U.S. Pat. No. 4,454,015 on June 12, 1984.

BACKGROUND OF THE INVENTION

1. Field of the Invention

This invention relates to a composite comprising one or more substantially interwoven matrix compositions each containing a refractory hard metal. More particularly, this invention relates to a densified composite comprising one or more substantially interwoven matrix compositions each comprising a refractory hard metal and a metal compound, which may optionally also contain one or more densification materials; and methods of forming such composites.

2. Description of the Prior Art

Refractory hard metals, such as $TiB_2$ or $ZrB_2$ are useful in applications where a material is needed possessing chemical inertness and/or mechanical strength, particularly at elevated temperatures. Such uses include dies for drawing, forming, or extruding; adiabatic engine components; abrasive disks or wheels; structural components; tool bits; or as electrodes, e.g., a cathode, in an electrolytic reduction cell for the production of metal, such as aluminum.

The use of ceramic materials in applications requiring resistance to high temperature, corrosion conditions, and high wear conditions is not new. For example, the use of laminated layers of two or more ceramic materials to form refractory tubes is described in Milligan et al U.S. Pat. No. 2,640,503; Venable U.S. Pat. No. 3,714,971; and Dancy et al U.S. Pat. No. 4,082,863. Ceramic materials have also been impregnated or dispersed in other ceramic materials to improve the characteristics of the resulting product. For example, Kaneko et al U.S. Pat. No. 3,919,755 describes a ceramic liner for an automobile exhaust system comprising a material such as alumina or silica impregnated with a suitable heat-resistant such as sodium silicate or colloidal silica and Moore et al U.S. Pat. No. 3,284,144 teaches forming a gas-lubricated bearing using discrete alpha alumina crystals in a glassy matrix such as a silica glass containing alumina and magnesia.

Bearings with ceramic liners have been proposed in British Pat. No. 1,389,410; while Tucker U.S. Pat. No. 3,941,903 teaches the use of a wear-resistant hard phase bearing material such as a metal oxide, metal carbide, metal boride, metal nitride or metal silicide, e.g., alumina, titanium boride, zirconium boride, etc., uniformly dispersed in a soft ductile metal matrix.

Combinations of ceramic and metal layers have also been used such as metal pipes with ceramic liners by Sowards U.S. Pat. No. 3,568,723; and in the production of ceramic lined cylinder walls for internal combustion engines by Kistler Re. U.S. Pat. No. 23,976. Metal gun barrels with ceramic liners are described by Whitlow U.S. Pat. No. 3,523,035; Thomsen U.S. Pat. No. 3,742,640; and Claussen et al U.S. Pat. No. 4,401,729.

In my parent U.S. patent application Ser. No. 604,913, there is disclosed a novel composition in which a refractory hard metal, such as $TiB_2$, is formed in a substantially interwoven matrix with a metal compound by a displacement reaction. This invention relates to a densified composite which includes one or more of such substantially interwoven matrix compositions and the method of making such composites.

SUMMARY OF THE INVENTION

It is, therefore, an object of the present invention to provide a densified composite comprising one or more substantially interwoven matrix compositions each comprising a refractory hard metal and a metal compound.

It is another object of the present invention to provide a densified composite comprising one or more substantially interwoven matrix compositions each comprising a refractory hard metal and a metal compound wherein the densified composite may be formed by adding one or more densifying agents to the reactants prior to formation of the interwoven matrix composition.

It is yet another object of the present invention to provide a densified composite comprising one or more substantially interwoven matrix compositions each comprising a refractory hard metal and a metal compound wherein the densified composite is formed by subjecting the reactants which form the interwoven matrix composition to pressure during formation of the interwoven matrix composition.

It is a further object of the present invention to provide a densified composite comprising one or more substantially interwoven matrix compositions each comprising a refractory hard metal and a metal compound wherein the densified composite is formed by subjecting the already formed interwoven matrix composition to a densifying process.

It is yet a further object of the present invention to provide a densified composite comprising one or more substantially interwoven matrix compositions each comprising a refractory hard metal and a metal compound wherein the densified composite is formed by subjecting the already formed interwoven matrix composition to a densifying process which comprises heating the interwoven matrix composition after formation thereof to a temperature sufficient to densify the interwoven matrix composition.

It is a still further object of the present invention to provide a densified composite comprising one or more substantially interwoven matrix compositions each comprising a refractory hard metal and a metal compound wherein the densified composite is formed by subjecting the already formed interwoven matrix composition to a densifying process which comprises adding at least one densification material to the already formed interwoven matrix composition.

It is another object of the present invention to provide a densified composite comprising one or more substantially interwoven matrix compositions each comprising a refractory hard metal and a metal compound wherein the densified composite is formed by subjecting the already formed interwoven matrix composition to a densifying process which comprises adding molten metal or alloy, e.g., aluminum to the already formed interwoven matrix composition. The metal or alloy should, preferably, be one which will wet the composite material.

It is yet another object of the present invention to provide a densified composite comprising one or more substantially interwoven matrix compositions each comprising a refractory hard metal and a metal compound wherein the densified composite is formed by subjecting the already formed interwoven matrix composition to a densifying process which comprises adding molten alumina to the already formed interwoven matrix composition.

These and other objects of the invention will be apparent from the description of the invention and accompanying flowsheet.

In accordance with these objects, there is provided a densified composite comprising one or more substantially interwoven matrix compositions which have been densified.

BRIEF DESCRIPTION OF THE DRAWING

The sole figure is a flowsheet illustrating the invention.

DETAILED DESCRIPTION OF THE INVENTION

Figure 1:
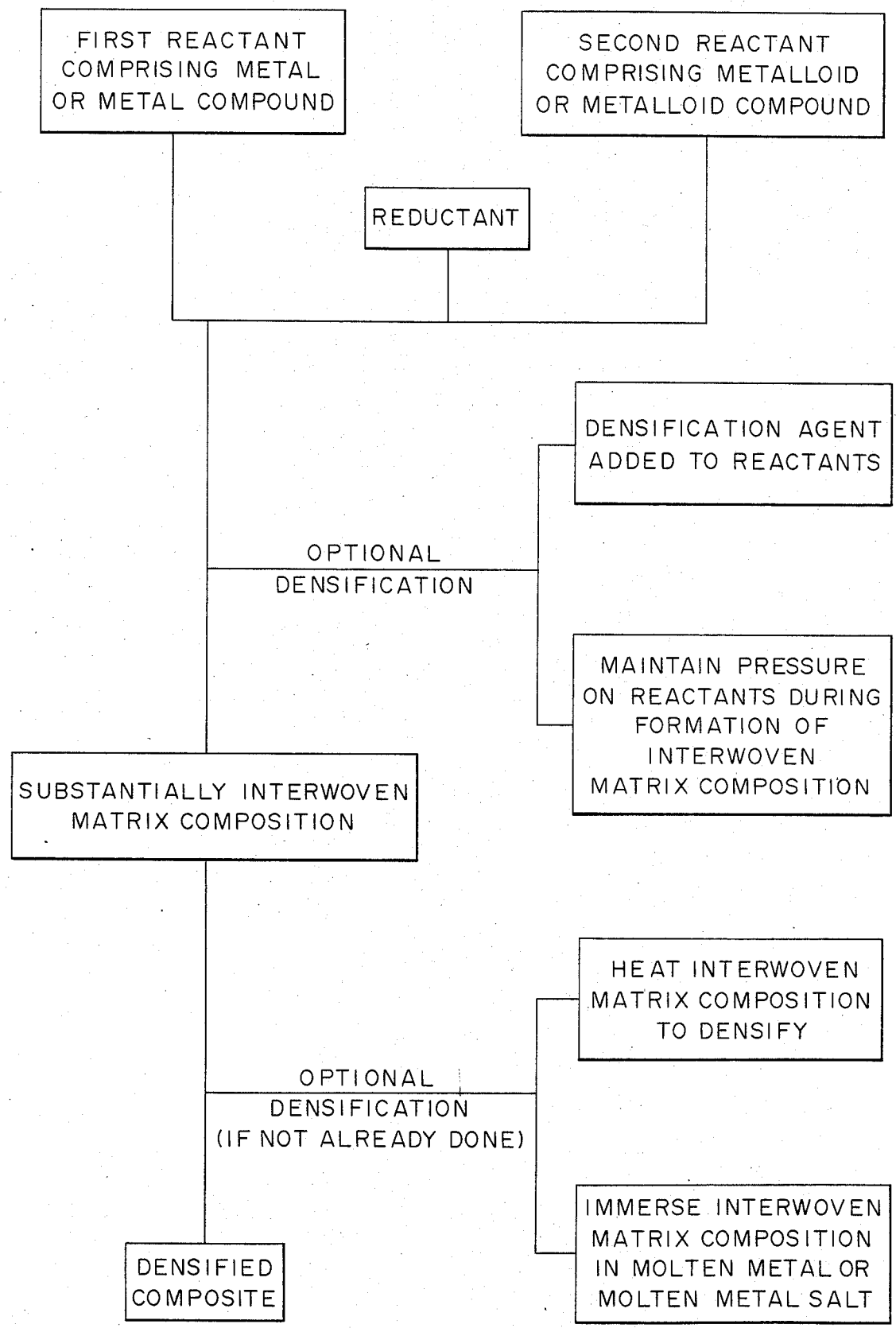

The invention comprises a novel densified composite containing one or more compositions each of which comprise a substantially interwoven matrix mixture of a refractory hard metal and a metal compound. The densified composite may be particularly useful in applications requiring a strong, hard substance such as dies used in drawing, forming, or extruding; adiabatic engine components; abrasive disks or wheels; armor; gun barrels; tool bits; and structural components.

The substantially interwoven matrix compositions suitable for use in making the densified composite of the invention may be formed by reacting together a first reactant and a second reactant in the presence of a third reactant to provide a reaction wherein the reactants combine to form a substantially interwoven matrix of a conductive material and an insulating material. In a preferred embodiment, the first reactant is a metal or a metal compound; the second reactant is a metal or a metal compound; and the third reactant is a material capable of being oxidized.

In a particularly preferred embodiment, the first reactant is a metal or a metal compound: the second reactant is a metalloid or a compound formed from a metalloid; and the third reactant is a reductant such that the reactants form a substantially interwoven matrix of a refractory hard metal and a metal compound. The term "metalloid" is herein defined to include boron, nitrogen, carbon, silicon, and sulfur.

The first reactant is preferably selected from the class consisting of a metal; and oxides, carbides, nitrides, and silicides of metals. The second reactant is typified by silicon, boron, carbon, nitrogen, and the like or their compounds, e.g., oxides of silicon and boron and nitrides of sodium and potassium. The third reactant is preferably selected from Al, Mg, Ca, Ba, and the like.

In accordance with a preferred embodiment of the invention, the metal compound, e.g., metal oxide, resulting from the reaction is dispersed throughout the refractory hard metal thereby forming a substantially interwoven matrix with the refractory hard metal resulting in a composition having a high level of conductivity.

In a particularly preferred embodiment of the invention in which the resultant interwoven matrix composition comprises a titanium diboride or zirconium diboride refractory hard metal substantially interwoven with aluminum oxide, the first reactant may comprise metallic titanium or zirconium, TiO, ZrO, TiO$_2$, or ZrO$_2$; the second reactant maybe boron oxide; and the third reactant may be metallic aluminum. Some of the possible reactions for this embodiment are illustrated as follows:

$$Ti + B_2O_3 + 2Al \rightarrow TiB_2 + Al_2O_3$$

$$TiO + B_2O_3 + 8/3Al \rightarrow TiB_2 + 4/3Al_2O_3$$

$$TiO_2 + B_2O_3 + 10/3Al \rightarrow TiB_2 + 5/3Al_2O_3$$

$$Zr + B_2O_3 + 2Al \rightarrow ZrB_2 + Al_2O_3$$

$$ZrO + B_2O_3 + 8/3Al \rightarrow ZrB_2 + 4/3Al_2O_3$$

$$ZrO_2 + B_2O_3 + 10/3Al \rightarrow ZrB_2 + 5/3Al_2O_3$$

While such reactions are illustrated in stoichiometrically balanced equations which provide stoichiometrically balanced compounds, it will be understood that the use of non-stoichiometric compounds are contemplated within the purview of the invention. Further, the ratio of TiB$_2$ or ZrB$_2$ to Al$_2$O$_3$ in the substantially interwoven matrix product can be varied, as will be noted herein, and such is also contemplated within the invention.

The term "refractory hard metal", as used herein, is intended to define compounds, such as metal nitrides, borides, carbides, silicides, or sulfides, formed by reacting a metalloid, or a metalloid compound, with a refractory metal or a refractory metal compound, such as, for example, titanium, zirconium, hafnium, chromium, titanium oxide, zirconium oxide, or mixtures thereof.

The amount of the first reactant or reactants, used to form the substantially interwoven matrix composition utilized in the invention, should comprise 15 to 48 mol. % of metals or metal oxides, e.g., Ti or Zr, or oxides of Ti or Zr. In a preferred embodiment, the first reactant may comprise 15 to 25 mol. % oxides of Ti or Zr, the second reactant may comprise 15 to 25 mol. % B$_2$O$_3$, and the third reactant may comprise 50 to 70 mol. % Al. To the reactants may also be added 0 to 80 wt. % of one or more additional metals or metal compounds as a densifying agent as will be described herein below. The reactants can be initially blended by mixing powders of the reactants and reductants and compacting them to pressures in the range of 5,000 to 40,000 psi. The initial reactants may also be formed into the desired shape by using isostatic pressing techniques well known to those skilled in the art.

The displacement reaction to form the substantially interwoven matrix may be locally initiated by exposing a selected portion, such as an end of the compact, to a temperature sufficient to initiate the exothermic reaction. Such local initiation is described in more detail in my copending application Ser. No. 789,435, entitled "METHOD OF FORMING SUBSTANTIALLY INTERWOVEN MATRIX CONTAINING A REFRACTORY HARD METAL" AND A METAL COMPOUND, filed on even date with this application and assigned to the assignee of this invention, cross-reference to which is hereby made, (hereinafter referred to as my copending "local initiation" application). In that application I have described and claimed methods for locally initiating an exothermic displacement reaction wherein the exothermic heat generated is then used to sustain the reaction through the remainder of the material. The use of such a method has distinct advantages such as conservation of heat energy used in producing such compositions as well as more rapid cool down when the heat is mainly internally generated.

As described in my aforementioned copending "local initiation" patent application, the heat to locally initiate the reaction may, for example, be supplied by a local resistance heater, by directing a source of heated gas or hot air at the formed object, or by using an inductive coil. Additional heat, supplied to the entire body, may be used to supplement the locally generated exothermic heat, if necessary. This may be particularly important if the particular reactants do not generate sufficient exothermic heat to sustain the displacement reaction.

The composite of the invention may include more than one of the previously described compositions each comprising a substantially interwoven matrix mixture of a refractory hard metal and a metal compound. For example, in my copending application Ser. No. 789,438 entitled "COMPOSITES COMPRISING ONE OR MORE INTERWOVEN MATRIX COMPOSITION EACH CONTAINING A REFRACTORY HARD METAL AND METHOD OF FORMING SAME", filed on even date and assigned to the assignee of this invention, cross-reference to which is hereby made, (hereinafter referred to as my copending "coreactants" application) I describe and claim formation of such a mixture by physically mixing together two previously formed compositions, each comprising a different substantially interwoven matrix composition comprising a refractory hard metal and a metal compound. I also describe and claim in that application the formation of the mixture in situ, by mixing together the components which will react to form the compositions which each comprise a substantially interwoven matrix of a refractory hard metal and a metal compound.

One of the advantages of forming the mixture of substantially interwoven matrix compositions by mixing together the components which will react to form the compositions is to use such an in situ formation as a temperature control to control the amount of exothermic heat released as the reaction proceeds to form the substantially interwoven matrix. For example, the reaction between $TiO_2$, $B_2O_3$, and aluminum is very exothermic and releases large quantities of heat. In some instances, the excessive amount of heat released and consequent sudden liberation of suboxides of reactants and adsorbed gases during the exothermic reaction to form a substantially interwoven matrix of, for example, $TiB_2$ and $Al_2O_3$ will result in distortion or warping of the shape of a green ceramic initially from a mixture of the reactants formed prior to the exothermic reaction to form the interwoven matrix. If such reactants are mixed, however, prior to the displacement reaction, with other reactants which also react to form a substantially interwoven matrix, but with release of less exothermic heat, the resultant composite of two or more compositions, each of which comprises a substantially interwoven matrix of a refractory hard metal and a metal compound, may be formed without substantial distortion or warping of the final product. In such cases, additional benefit may arise from mutual solid solubility of refractory hard metals.

Thus, for example, if the reactants, which will respectively form substantially interwoven matrices of $ZrB_2$ and $Al_2O_3$, and $TiB_2$ and $Al_2O_3$, are mixed together in amounts which will form, upon subsequent reaction, ratios in the mixture of interwoven matrix compositions of from 20 wt. % $TiB_2$/80 wt. % $ZrB_2$ to 80 wt. % $TiB_2$/20 wt. % $ZrB_2$, the excessive amount of exothermic heat generated by the reaction to form the $TiB_2$ may be controlled due to the lesser amount of heat liberated by the exothermic reaction to form the $ZrB_2$ interwoven matrix whereby the shape of the resulting composite will not be distorted or warped as might be a product formed using only the $TiB_2$ reactants.

It should be noted that heat generated by the reaction: $3TiO_2 + 3B_2O_3 + 10Al \rightarrow 3TiB_2 + 5Al_2O_3$ is approximately $3.63 \times 10^6$ Joules/Kgm whereas the heat generated by the reaction: $3ZrO_2 + 3B_2O_3 + 10Al \rightarrow 3ZrB_2 + 5Al_2O_3$ is approximately $2.64 \times 10^6$ Joules/Kgm. It should also be remembered that the geometry of the reactant piece and heat loss in the reaction chamber will control the final temperature of the production.

As also discussed in my aforementioned copending "coreactants" patent application, the composite may further comprise, in addition to one or more substantially interwoven matrices of a refractory hard metal and a metal compound, one or more previously formed refractory hard metal compositions. For example, the composite may include a mixture of previously formed $TiB_2$ and the reactants which will react, via a displacement reaction, to form an interwoven matrix composition of $TiB_2$ and $Al_2O_3$, e.g., $TiO_2$, $B_2O_3$, and metallic Aluminum. The addition of at least 3 wt. %, and preferably 20 wt. %, of previously formed $TiB_2$, for example, to the above reactants has been found to control the amount of exothermic heat liberated in the displacement reaction to an extent which permits formation of the desired or controlled shapes without the undesirable side effects from the generation of excessive exothermic heat.

However, it will be appreciated that the amount of, for example, $TiB_2$, $ZrB_2$, or a combination thereof, which may be added without any detrimental effects may be limited by the amount of exothermic heat needed to sustain propagation of the reaction through the remainder of the formed object if the local initiation methods previously described with respect to my aforementioned copending "local initiation" patent application are used when forming the interwoven matrix composition. If such methods are used to produce the composite of this invention, it can be seen that if too much of the reaction product, e.g., $TiB_2$ or $ZrB_2$, is added, for example, insufficient heat may be exothermically generated to sustain the desired propagation of the reaction throughout the formed object.

Other previously formed refractory hard metals may be added to the reactants instead of $TiB_2$ or $ZrB_2$. Examples of other such refractory hard metals are set forth in a publication entitled "Inert Cathodes and Anodes for Aluminum Electrolysis" by K. Billenhaug and H. A. Oye published by Aluminum Verlag GmbH, Dusseldorf, West Germany, 1981, incorporated herein by reference.

As further discussed in my copending "coreactants" patent application, combinations of reaction products of previous displacement reactions, for example, may also be added to the reactants, as noted herein. For example, reaction products, such as an interwoven matrix of $TiN$—$Al_2O_3$ may be added. Of course, the levels or ratios of $TiN$ (titanium nitride) or $Al_2O_3$ in such reaction product can also be varied depending on the amount of each or both mixed in with the initial reactants, as noted herein with respect to the $TiB_2$—$Al_2O_3$ product. When the first reactant contains titanium, preferred refractory hard metals to be added with the reactants include TiN and TiC, as well as $TiB_2$ noted above.

In accordance with the present invention, the densified composite of the invention may be formed in one of several ways. First of all, the densified composite of the invention may be formed, in situ, during formation of the substantially interwoven matrix composition, or mixture of compositions. This may be accomplished in one of two ways.

In accordance with one embodiment of the invention, the powdered initial reactants may be uniaxially pressed at a pressure of about 1,000 to 60,000 psi which pressure is maintained during the entire period in which the reaction is carried out either by local initiation or by heating the entire body in a furnace. The pressure is then removed after the reaction is completed. Care must be exercised, however, in the practice of this embodiment of the invention with respect to the selection of die materials which will be inert to the reaction taking place within the dies during the formation of the shaped object. Maintenance of this pressure on the reactants during formation of the interwoven matrix composition or compositions can result in the formation of a densified composite having very little porosity.

The densified composite may also be formed during the initial reaction to form the substantially interwoven matrix composition by the addition to the prior described reactants of up to 20 wt. % of a densifying agent which, while not entering into the reaction, will fill up the pores of the reaction mass as it forms to thereby form the densified composite of the invention. Examples of such densifying materials include Fe, Ni, Al, Mg, Ca, Co, Si, Sn, Ti, Cr, Mn, W, Nb, Ta, Zr, Cu, Li, and Y; or the oxides thereof. For example, it has been found that the addition of about 3 wt. % Fe to the reactants to form $TiB_2$—$Al_2O_3$ matrix can increase the density from 10 to 70%.

In a particular embodiment, the densifying agent may also comprise, in whole or in part, up to 80 wt. % of previously formed refractory hard metals, e.g., previously formed $TiB_2$ and/or $ZrB_2$.

In any event, the amount of the densification agent added must, in accordance with the invention, be sufficient to raise the density to at least 75%, preferably 80%, and most preferably 90%, of the calculated theoretical density. The densification process may also be carried out after formation of the substantially interwoven matrix composition or compositions. In one embodiment, the substantially interwoven matrix composition may be densified by heating the composition to a temperature of about 1500° to 2000° C. or just below the melting point of the lowest melting point ingredient in the interwoven matrix and maintaining the composition at this temperature for a period of time sufficient to densify the composition to a density of at least about 75% of the theoretical density, typically from about 15 minutes to 3 hours.

In another embodiment, the substantially interwoven matrix composition or compositions may be densified after formation by heating the composition to the melting temperature of a metal or metal alloy and then impregnating the pores of the composition with the molten metal. For example, in a preferred embodiment where a $TiB_2$/$Al_2O_3$ interwoven matrix has been formed, the matrix composition may be heated to about 660° C. and then treated with molten aluminum to fill the pores of the matrix composition with metallic aluminum to provide the densified composite of the invention.

This process may be carried out by immersing the matrix composition in a vessel containing the molten metal for a period of time sufficient to permit the molten metal to impregnate the pores of the matrix composition. Usually from about 5 to 15 minutes is a sufficient time period. When molten aluminum is used, for example, to fill the pores of a previously formed $TiB_2$/$Al_2O_3$ interwoven matrix composition, immersion of the interwoven matrix composition comprising $TiB_2$/$Al_2O_3$ in molten aluminum for 30 minutes causes the density to rise from 2.6 grams/cc before densification to 3.3 grams/cc after densification.

In yet another embodiment, the substantially interwoven matrix composition or compositions may be densified to form the dense composite of the invention by treating the previously formed matrix with a molten salt. The use of the term "molten salt" herein is intended to include molten metal oxides such as $Al_2O_3$. Impregnation of the substantially interwoven matrix composition by the molten salt may be accomplished by immersing the interwoven matrix composition in the molten salt bath for a time period sufficient to permit the molten salt to impregnate the pores of the matrix composition, typically from about 2 to 10 minutes. Most preferably, the molten salt used to impregnate the matrix composition comprises the same material as the second component in the interwoven matrix, e.g., $Al_2O_3$, when an interwoven matrix composition of $TiB_2$/$Al_2O_3$ is to be densified. The use of molten alumina to densify the pores of a previously formed $TiB_2$/$Al_2O_3$ interwoven matrix composition, for example, causes the density to rise from 2.3 grams/cc before densification to 4.18 grams/cc after densification.

The following examples will serve to further illustrate the invention.

EXAMPLE 1

100 grams of a mixture of reactants comprising 33.37 wt. % $TiO_2$, 29.07 wt. % $B_2O_3$, and 37.56 wt. % Al was mixed together. Both the $TiO_2$ and the $B_2O_3$ powders were screened to -48 mesh (Tyler Series) prior to mixing. The material was mixed for one hour and then seven 10 gram samples were formed by pressing at 15,000 psi and another five 5.7 gram samples were formed by pressing at 25,000 psi. The samples, after pressing, had the following characteristics:

TABLE I

| Sample No. | Pressure (psi) | Length (cm) | Diameter (cm) | Density (gms/cc) |
|---|---|---|---|---|
| 1-7 | 15,000 | 4.36 | 1.28 | 1.78 |
| 8-12 | 25,000 | 2.39 | 1.29 | 1.83 |

The samples were loaded into a reaction chamber which was evacuated and then flushed with Argon gas at a flow rate of 325 cc/min. The chamber was slowly heated to about 1400° C. The heat was then turned off and the chamber was purged with dry air at 400 cc/min for a period of one hour. The samples were warped in appearance, but x-ray analysis indicated that $TiB_2$ and $Al_2O_3$ were formed. Weight and dimensional data was then determined for some of the reacted samples as follows:

TABLE II

| Sample No. | Length (cm) | Diameter (cm) middle | Weight (gms) | Density (gms/cc) |
|---|---|---|---|---|
| 1 | 4.08 | 1.17 | 9.91 | 2.10 |
| 2 | 4.12 | 1.15 | 8.74 | 2.04 |
| 3 | 4.23 | 1.16 | 10.87 | 2.43 |
| 4 | 2.8 | 1.16 | 6.71 | 2.06 |

EXAMPLE 2

The procedure of Example 1 was repeated using a mixture of reactants comprising 32.24 wt. % $TiO_2$, 28.09 wt. % $B_2O_3$, 36.29 wt. % Al powder and 3.38 wt. % Fe powder. Both the $TiO_2$ and the $B_2O_3$ powders were again screened to -48 mesh (Tyler Series) prior to mixing. The material was mixed for several hours and then four 10 gram samples were formed by pressing at 15,000 psi and another 10 gram sample was formed by pressing at 25,000 psi. The samples, after pressing, had the following characteristics:

TABLE III

| Sample No. | Pressure (psi) | Length (cm) | Diameter (cm) | Density (gms/cc) |
|---|---|---|---|---|
| 1-4 | 15,000 | 3.766 | 1.296 | 2.034 |
| 5 | 25,000 | 3.629 | 1.290 | 2.102 |

These samples were also loaded into the reaction chamber which was evacuated and then flushed with argon gas at a flow rate of 325 cc/min. The chamber was again slowly heated to a temperature of about 1400° C. over a period of seven hours. The heat was then turned off and the chamber was purged with dry air at 400 cc/min for a period of one hour. Weight and dimensional data was then determined for some of the reacted samples as follows:

TABLE IV

| Sample No. | Weight (gms) | Density (gms/cc) |
|---|---|---|
| 2 | 9.74 | 3.017 |
| 3 | 9.73 | 3.04 |
| 4 | 9.73 | 2.94 |
| 5 | 9.71 | 3.06 |

EXAMPLE 3

Three rectangular plates, each containing 80 wt. % of a mixture containing 1 mole $ZrO_2$, 1 mole $B_2O_3$, and 10/3 mole Al powder and 20 wt. % of a mixture of 80 wt. % $Al_2O_3$ with 20 wt. % $ZrO_2$ powder, were formed by pressing at 15,000 psi. The weight and dimensions of the samples are given below.

TABLE V

| Sample No. | Weight (gms) | Width (cm) | Length (cm) | Thickness (cm) | Density (gms/cc) |
|---|---|---|---|---|---|
| 1 | 83.46 | 5.11 | 5.44 | 1.29 | 2.33 |
| 2 | 84.45 | 5.10 | 5.51 | 1.29 | 2.33 |
| 3 | 84.97 | 5.11 | 5.56 | 1.29 | 2.32 |

A layer of 80 wt. % $Al_2O_3$/20 wt. % $ZrO_2$ (alumina/zirconia) powder approximately 1.3 cm thick was placed on top of calciastabilized zirconia powder in a crucible. Then one of the pressed plate samples was laid on top of the 80/20 alumina/zirconia powder. Another 80/20 alumina/zirconia layer was then placed over the first pressed plate and a second pressed plate sample was then put on the alumina/zirconia layer. Another 80/20 alumina/zirconia layer was then formed and the third pressed plate was placed over this layer. A final layer of the 80/20 alumina/zirconia powder was then placed on top.

The crucible was introduced into a reaction chamber which was evacuated and then flushed with argon. The chamber was slowly heated to a temperature of approximately 2050° C., at which point molten $Al_2O_3$—$ZrO_2$ infiltrated the porous plates. This temperature is significantly above the temperature where the exothermic reaction is initiated. The temperature was kept at approximately 2000° C. for approximately ½ hour, and then the samples are allowed to slowly cool down in an argon atmosphere. The plates were found to have a density of 4.18 gm/cc. This can be compared with a density of 2.3 gm/cc when only a mixture of 80 wt. % ($ZrB_2$—5/3$Al_2O_3$) and 20 wt. % ($Al_2O_3$—20 wt. % $ZrO_2$) sample is fabricated without any attempt at densification by molten ceramic infiltration.

EXAMPLE 4

A poorly dense product was formed by following the Example 1 with a reactant powder containing 80 wt. % (33.37 wt. % $TiO_2$, 29.07 wt. % $B_2O_3$, and 37.56 wt. % Al powder) and 20 wt. % (80 wt. % $Al_2O_3$—20 wt. % $ZrO2$) powder. Powder mixtures of the above composition was pressed and fabricated in the form of plates with a density of 2.37-2.60 gm/cc by following the procedure outlined in Example 1. One of these plates, with a density of 2.6 gm/cc., was then infiltrated with molten aluminum which was held in a graphite crucible with a molten fluoride flux on top of the molten aluminum. After the infiltration of molten aluminum the density of the plate was 3.31-3.33 gm/cc showing a substantial increase of the density of the plate by filling the pores in the porous product. The infiltration may be facilitated by use of vacuum or by application of pressure.

Thus, the invention provides a densified composite formed from one or more substantially interwoven matrix compositions wherein the densified composite may be formed in situ with the formation of the substantially interwoven matrix composition or compositions either by use of a densification agent or by maintaining pressure on the reactants as the interwoven matrix is formed. The densified composite of the invention may also be formed after formation of the substantially interwoven matrix composition either by a post heat treatment or by treating the interwoven matrix with a molten densification agent which may comprise a metal or a metal salt and preferably comprises additional amounts of a material already present in the interwoven matrix or a material compatible with the materials comprising the interwoven matrix.

While the invention has been described in terms of preferred embodiments, the claims appended hereto are intended to encompass other embodiments which fall within the spirit of the invention.

What is claimed is:

1. A method of forming a densified composite which comprises:

(a) forming a mixture of reactants capable of reacting to form at least two substantially interwoven matrix compositions, each of said interwoven matrix compositions consisting essentially of a refractory hard metal and a meal compound formed by reacting together:

(1) a first reactant selected from the group consisting of a metal; and oxides, carbides, nitrides, and silicides of metals;

(2) a second reactant consisting of a metalloid selected from the group consisting of boron, nitrogen, carbon, silicon, and sulfur; or a compound formed from such a metalloid; and (3) a third reactant consisting of a reductant selected from the group consisting of Al, Mg, Ca, and Ba which simsutaneously oxidizes to form said metal compound;

(b) pressing said reactants together at a pressure of from 1000 to 25,000 psi; and (c) maintaining said pressure on said reactants while reacting said mixture to form said interwoven matrix compositions;

whereby said interwoven matrix compsitions will be sufficiently denisified to form a densified composite having a density of at least 90% of the calculated theoretical density.

2. A method of forming a densified composition which comprises:

(a) forminng a mixture of reactants capable of reacting to form one of more substantially interwoven matrix compositions, each of said one or more interwoven matrix compositions consisting essentially of a reefractory hard metal and a metal compound formed by reacting together:

(1) a first reactant selected from the group consisting of a metal; and oxides, carbides, nitrides, and silicides of metals;

(2) a second reactant consisting of a metalloid selected from the group consisting of boron, nitrogen, carbon, silicon, and sulfur; or a compound formed from such a metalloid; and (3) a third reactant consisting of a reductant selected from the group consisting of Al, Mg, Ca, and Ba which simultaneously oxidizes to form said metal compound;

(b) adding to said mixture of reactants up to 20 wt. % of one or more densifying agents selected from the class consisting of Fe, Ni, Al, Mg, Ca, Co, Si, Sn, Ti, Cr, Mn, W, Nb, Ta, Zr, Cu, Li, and Y;

(c) reacting said mixture to form said interwoven matrix composition;

whereby said interwoven matrix composition will be sufficiently densified to form a densified composite having a density of at least 75% of the calculated theoretical density.

3. A method of forming densified composite which comrpises:

(a) forming a mixture of reactants capable of reacting to form one or more substantially interwoven matrix compositions, each of said one or more interwoven matrix compositions consisting essentially of a refractory hard metal and a metal compound formed by reacting together:

(1) a first reactant selected from the group consisting of a metal; and oxides, carbides, nitrides, and silicides of metals;

(2) a second reactant consisting of a metalloid selected from the group consisting of boron, nitrogen, carbon, silicon, and sulfur; or a compound formed from such a metalloid; and (3) a third reactant consisting of a reductant selected from the group consisting of Al, Mg, Ca, and Ba which simultaneously oxidizes to form said metal compound;

(b) reacting said mixture to form said interwoven matrix composition; and (c) heating said interwoven matrix composition after formation thereof to a temperature of from 1500 to 2000° C. for a period of form 15 minutes to 3 hours to densify said interowven matrix composition sufficiently to form a densified composite having a density of at least 80% of the calculated theoretical density.

4. A method of forming a densified composite which comprises:

(a) forming a mixture of reactants capable of reacting to form one or more substantially interwoven matrix compositions, each of said one or more inter woven matrix compositions consisting essentially of a refractory hard metal and a metal compound formed by reacting together;

(1) a first reactant selected from the group consisting of a metal; and oxides, carbides, nitrides, and silicides of metals;

(2) a second reactant consisting of a metalloid selected from the group consisting of boron, nitrogen, carbon, silicon, and sulfur; or a compound formed from such a metalloid; and (3) a third reactant consisting of a reductant selected from the group consisting of Al, Mg, Ca, and Ba which simultaneously oxidizes to form said metal compound;

(b) reacting said mixture to form said interwoven matrix composition; and (c) immersing said interwoven matrix composition after formation thereof in a molten metal consisting essentially of one or more metals selected from the class consisting of Fe, Ni, Al, Mg, Ca, Co, Si, Sn, Ti, Cr, Mn, W, Nb, Ta, Zr, Cu, Li and Y to impregnate the pores of said interwoven matrix composition with said molten metal sufficiently to thereby form a densified composite having a density of at least 80% of the calculated theoretical density.

5. A method of forming a densified composite which comprises:

(a) forming a mixture of reactants capable of reacting to form one or more substantially interwoven matrix compositions, each of said one or more inter woven matrix compositions consisting essentially of a refractory hard metal and a metal compound formed by reacting together:

(1) a first reactant selected from the group consisting of a metal; and oxides, carbides, nitrides, and silicides of metals;

(2) a second reactant consisting of a metalloid selected from the group consisting of boron, nitrogen, carbon, silicon, and sulfur; or a compound formed from a such metalloid; and (3) a third reactant consisting of a reductant selected from the group consisting of Al, Mg, Ca, and Ba which simultaneously oxidizes to form said metal compound;

(b) reacting said mixture to form said interwoven matrix composition; and (c) immersing said interwoven matrix composition after formation thereof in-a molten metal salt consisting essentially of a salt of one or more metals selected from the class consisting of Fe, Ni, Al, Mg, Ca, Co, Si, Sn, Ti, Cr, Mn, W, Nb, Ta, Zr, Cu, Li, and Y to impregnate the pores of said interwoven matrix composition with said molten metal salt sufficiently to thereby form a densified composite having a density of at least 80% of the calculated theoretical density.

* * * * *